(12) United States Patent
Maher et al.

(10) Patent No.: US 8,180,998 B1
(45) Date of Patent: May 15, 2012

(54) SYSTEM OF LANES OF PROCESSING UNITS RECEIVING INSTRUCTIONS VIA SHARED MEMORY UNITS FOR DATA-PARALLEL OR TASK-PARALLEL OPERATIONS

(75) Inventors: Monier Maher, St. Louis, MO (US); Christopher Lamb, San Jose, CA (US); Sanjay J. Patel, Urbana, IL (US); Peter Hsu, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 682 days.

(21) Appl. No.: 12/208,231

(22) Filed: Sep. 10, 2008
(Under 37 CFR 1.47)

Related U.S. Application Data

(60) Provisional application No. 60/971,125, filed on Sep. 10, 2007.

(51) Int. Cl.
*G06F 15/16* (2006.01)
(52) U.S. Cl. .................. 712/20; 712/21; 712/22
(58) Field of Classification Search .................. None
See application file for complete search history.

(56) References Cited

U.S. PATENT DOCUMENTS

| | | | |
|---|---|---|---|
| 5,828,894 A * | 10/1998 | Wilkinson et al. | 712/20 |
| 6,446,141 B1 | 9/2002 | Nolan et al. | |
| 6,591,107 B1 | 7/2003 | Sonetaka | |
| 6,687,796 B1 | 2/2004 | Laine et al. | |
| 7,593,433 B1 | 9/2009 | Wu et al. | |
| 7,831,803 B2 * | 11/2010 | Inglet et al. | 712/20 |
| 2002/0095684 A1 | 7/2002 | St. John et al. | |
| 2003/0058869 A1 | 3/2003 | Novick | |
| 2004/0192320 A1 | 9/2004 | Khawand et al. | |
| 2004/0213259 A1 | 10/2004 | Porter | |
| 2006/0193256 A1 | 8/2006 | Burns et al. | |

OTHER PUBLICATIONS

Office Action dated Dec. 2, 2011 from U.S. Appl. No. 12/208,235.

\* cited by examiner

*Primary Examiner* — Kenneth Kim
(74) *Attorney, Agent, or Firm* — Patterson & Sheridan, LLP

(57) ABSTRACT

A system for performing data-parallel operations and task-parallel operations. A first switch fabric node (SFN) includes first and second lane processing engines (LPEs). The first LPE includes a first set of lane processing units (LPUs) configured to perform data-parallel operations, where each LPU performs a set of operations, and each LPU uses a different set of data for the set of operations, and each LPU within the first set of LPUs uses a different set of data for the set of operations. The second LPE includes a second set of LPUs configured to perform task-parallel operations, where each LPU performs a different set of operations. A processing control engine (PCE) is configured to distribute instructions and data to the first LPE and the second LPE. Advantageously, data parallel operations and task parallel operations are able to be performed on the same processor simultaneously.

18 Claims, 6 Drawing Sheets

SYSTEM OF LANES OF PROCESSING UNITS RECEIVING INSTRUCTIONS VIA SHARED MEMORY UNITS FOR DATA-PARALLEL OR TASK-PARALLEL OPERATIONS

CROSS-REFERENCE TO RELATED APPLICATIONS

This application claims the priority benefit of provisional U.S. Patent Application Ser. No. 60/971,125, filed Sep. 10, 2007, the subject matter of which is hereby incorporated by reference.

BACKGROUND OF THE INVENTION

1. Field of the Invention

The present invention generally relates to parallel processing and more specifically to an architecture for executing irregularly parallel applications.

2. Description of the Related Art

There is an ever-increasing class of applications enabled by the significant increase in computing density provided by modern accelerator architectures. Such architectures include, for example, graphic processing units (GPUs), physics accelerators, attached co-processors, and other similar chips.

These applications span many domains, including graphics and physics for gaming and interactive simulation, medical imaging, data analysis (e.g., for oil and gas exploration), scientific computing, three-dimensional (3D) modeling for computer-aided design (CAD), signal processing, image and video compression, analysis, indexing, digital content creation, financial analytics, and the like. The rapid increase in compute density of accelerator chips, the rate of maturity of the programming models and environments, and the general realization of opportunity has caused this space of applications to experience rapid growth.

Candidate applications that benefit from these accelerator architectures are often visually-oriented and interactive. The prototypical application of this class is the raster-based rendering performed by modern GPUs.

The technological value of a typical accelerator architecture is typically based on the amount of data that the architecture is capable of processing per unit of time. The technological value of the accelerator architecture is increased when an increase in work (e.g., pixels, polygons, objects, frames, etc.) done per unit of time increases with each successive generation of the architecture. This property of accelerator architectures may be referred to as "data scale." For example, in the field of raster graphics, each generation of a GPU provides more processing power (more pixels per second), which enables game developers to deliver games with higher definition graphics, more complex geometry, and more stunning visual effects. These applications executed by the GPU may be executed in a highly parallel manner, and the rate of execution is increased based on architectural approaches that provide high performance through parallelism. When designing a chip for such application domains, performance is the paramount design parameter. The performance increase at each subsequent generation is, however, constrained by other factors including power budgets, schedule, robustness, and cost, die area, layout issues, and the like.

Another class of applications that benefits from parallelism is physics processing. Contrary to data parallel applications like raster graphics rendering, physics processing is parallel in an "irregular" manner. More specifically, when physics processing kernels, such as collision detection and constraint discovery and solving, are decoupled into threads, the threads require some degree of inter-communication. This intercommunication dictates how efficiently physics operations are performed on any given accelerator architecture. An architecture that provides inadequate supports for inter-thread communication and synchronization may perform poorly when executing certain types of physics processing workloads.

This class of applications that exhibit irregular parallelism may be referred to as "irregularly parallel applications." Such applications exhibit properties more suitable for thread-parallel machines, such as multi-core CPUs, rather than data parallel machines, such as GPUs. However, the scale of compute power required to execute irregularly parallel applications is similar to that required to execute data parallel applications.

Accordingly, there remains a need in the art for a processing system capable of efficiently supporting irregularly parallel applications.

SUMMARY OF THE INVENTION

Embodiments of the invention provide a system for performing data-parallel operations and task-parallel operations. A first switch fabric node (SFN) includes first and second lane processing engines (LPEs). The first LPE includes a first set of lane processing units (LPUs) configured to perform data-parallel operations, where each LPU performs a set of operations, and each LPU within the first set of LPUs uses a different set of data for the set of operations. The second LPE includes a second set of LPUs configured to perform task-parallel operations, where each LPU performs a different set of operations. A processing control engine (PCE) is configured to distribute instructions and data to the first LPE and the second LPE.

Alternative embodiments of the invention provide a method for bandwidth management in a parallel processing architecture. A controller receives configuration information specifying a number of channels to allocate for high-priority external memory unit transactions (EMU transactions), where each channel represents an amount of bandwidth dedicated to one high-priority EMU transaction. The controller then receives a first EMU transaction and determines that the first EMU transaction is a high-priority EMU transaction. The controller determines that one of the number of channels allocated for high-priority transactions is available, and processes the first EMU transaction using the available channel.

Advantageously, data parallel operations and task parallel operations are able to be performed on the same processor simultaneously.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
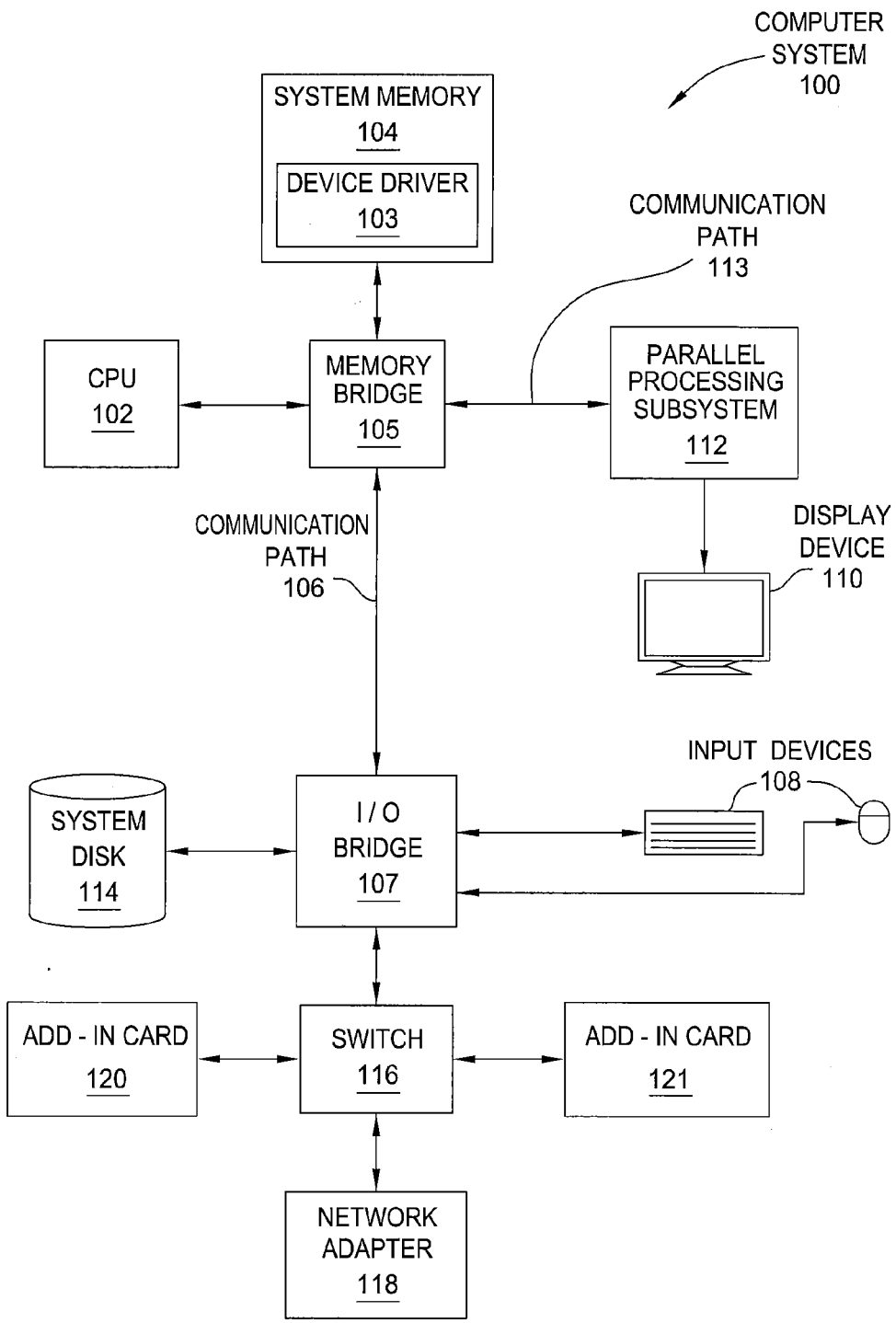
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link). In one embodiment, parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The design of PPS 112 may be implemented to support irregularly parallel computation in a high-throughput environment by providing a minimal core architecture (MCA), where each processing core provides minimal computing functionality to support a thread of execution such that the execution hardware is relatively small compared to conventional processing cores. Hardware requirements are further reduced by implementing software-based scheduling, which also allows greater flexibility for different algorithms. Accordingly, MCA promotes an overall chip design with very high performance per area (e.g., performance per square millimeter of silicon) or power-performance (e.g., performance per watt).

Each MCA core may be configured to provide enough functionality to support a general thread of execution (e.g., a register file for temporary values, a memory for quasi-permanent values, instruction execution units for basic and common operations, and synchronization and communication mechanisms for interacting with other threads), but no more. In order to reduce the area required per MCA core, tradeoffs are made to push functionality into software (e.g., global caching, coherence, virtualization, prioritization) so that more MCA cores can be integrated onto a chip. However, enough functionality is included to support the irregular nature of the target workloads, such as independent multiple instruction stream, multiple data stream (MIMD) execution, synchronization and communication support between MCA cores. Each MCA core is designed so that the performance increase provided by an acceleration feature (for example, a branch prediction table) is commensurate with the area required for that feature (i.e., marginal gain in performance greater than the marginal gain in area). In general, the performance of a single thread may be compromised if the overall parallel system performance is increased as a result.

An embodiment of this particular MCA would be a simple one-wide or two-wide pipeline that utilizes software techniques (static scheduling, loop unrolling, block transformations, pipelining) to properly schedule instructions to maximize pipeline utilization. The pipeline is kept short and latencies are kept low in order to make the compiler optimization problems more tractable. Maintaining the design principle of keeping the MCA cores small so that more can be integrated onto a chip, this exemplary MCA core embodiment would not contain enhancements such as out-of-order scheduling, which is commonly found in most commercially available multi-core processors.

The MCA approach has additional benefits. The reduced complexity of each MCA core provides for a reduced design time (thus lower cost), and shorter time to market. The fluid hardware-software boundary inherent to this approach (the external programmed API is a blend of hardware and software) reduces design constraint on the hardware and thus supports faster time-to-market. Additionally, legacy support does not require specific functionality in the hardware, further reducing time-to-market. The reduced size and complexity of each pipeline provides lower energy consumption (joules per operation), resulting in better power-performance of the overall chip. The combined effects of higher compute density and lower power at a given voltage and frequency is particularly suitable for applications that are highly parallel. The MCA approach described herein motivates the design of PPS 112, as described in greater detail below in FIG. 2.

Figure 2:
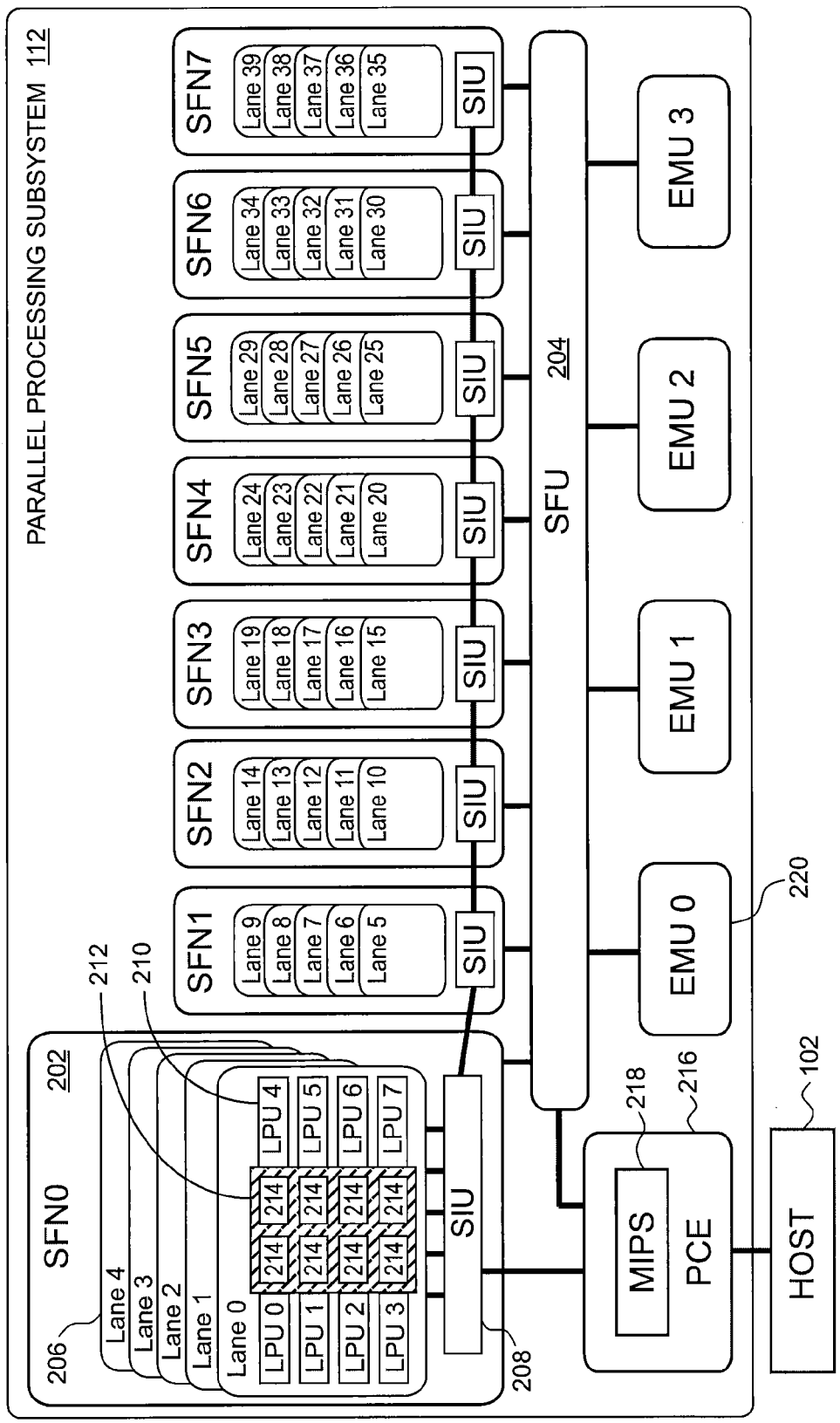
FIG. 2 is a block diagram of a parallel processing subsystem, according to one embodiment of the invention.

FIG. 2 is a block diagram of a PPS 112, according to one embodiment of the invention. As shown, FIG. 2 includes one or more switch fabric nodes (SFNs) 202, a switch fabric unit (SFU) 204, one or more lane processing engines (referred to herein as LPEs or "lanes") 206, one or more switch fabric interface units (SIU) 208, one or more lane processing units (LPUs) 210, an LPU interconnect 212, one or more shared memory units (SMUs) 214, a processor control engine (PCE) 216, a MIPS 218, and one or more external memory units (EMUs) 220.

The PPS 112 is designed to support applications that require "irregular parallelism." These applications require both data-parallelism and task-parallelism without sacrificing the overall goal of maximizing performance per unit area on the chip. Data parallelism is when multiple processing cores execute the same task across different sets of data. Task parallelism, in contrast, is when multiple processing cores execute different tasks across data that may be similar or related, or execute similar tasks asynchronously. PPS 112 is organized into a hierarchical structure comprised of SFNs 202 connected by the SFU 204. Each SFN 202 is comprised of lanes 206 connected by the SIU 208, where each lane 206 includes multiple LPUs 210 connected to one another and to the SMUs 214 by the LPU interconnect 212. Each lane in the PPS 112 is thus connected to every other lane in the PPS 112 via the combination of the SIU 208 and the SFU 204, referred to herein as the switch fabric network. The hierarchical structure described by the switch fabric network provides a highly scalable way to implement both task parallel processing and data parallel processing.

Each lane 206 includes software-configurable LPUs 210 that allow the PPS 112 to implement irregular parallel processing by operating the LPUs 210 in concert with other LPUs 210 within the lane 206, or operating each LPU 210 independently. Each LPU 210 may be a vector processing engine (VPE) that can be flexibly configured to perform a variety of vector processing-related operations or other types of operations. The configuration of each LPU 210 is based on the values of a plurality of memory-mapped registers that are stored in the SMUs 214 within the lane, as well as executable instructions that may also be stored in the SMUs 214. Each LPU 210 may access the SMUs 214 via the LPU interconnect 212 and extract configuration information, as well as instructions and other data. The SMUs 214 provide interrupt handling by including, within the plurality of registers, interrupt control registers accessible by the LPUs 210 within the lane 206. LPUs 210 also support atomic access primitives into the SMUs 214 so that fine-grained communication and synchronization between LPUs 210 may be maintained when the LPUs 210 access the SMUs 214. The LPUs 210 may also provide an exception handling mechanism comprised of specialized hardware that is assigned to each of the LPUs 210 within the SMUs 214 and that includes configuration registers and exception handling instructions. When an exception is encountered, an exception handler executes the exception handling instructions.

The LPUs 210 provide support for both hardware and software debugging. Hardware debugging is performed by allowing the exception handling mechanism to access and perform functional tests with the instructions and data stored in the SMUs 214. Software debugging is supported by one or more performance counters, hardware and data breakpoints, a global stall mechanism, and single stepping.

The performance counters may be used for performance profiling. For example, the performance counters could indicate how long a processor was stalled or how many load/store operations were executed.

Hardware breakpoints are provided to allow the LPUs 210 to initiate a hardware exception when a particular type of instruction is encountered. The exception handler may stall the lane 206 or the PPS 112 according to the outcome of one or more tests. A data breakpoint may assert an exception when a load/store operation attempts to access a particular address. The exception handler may perform one or more tests on the read or write data generated by the instruction to determine whether a stall is necessary and what type of stall to implement.

The LPU 210 has access to a memory-mapped configuration register that may be used to initiate a global stall operation for all LPUs 210 within the PPS 112. Once the LPUs 210 are stalled, the host 102 may access the SMUs 214 or the LPUs 210 for debugging purposes, and may then release the stall condition and continue operation.

PPS 112 supports both varieties of parallelism simultaneously, so that a first lane 206 may tightly synchronize the constituent LPUs 210 to perform data-parallel operations, while one or more other lanes 206 may loosely organize the constituent LPUs 210 to perform task-parallel operations. The lanes 206 coordinate operations via a flexible communication protocol that allows the LPUs 210 of different lanes 206 to communicate and synchronize operations. The LPUs 210 of each lane 210 may access the LPUs 210 of other lanes 206 within the overarching SFN 202 via the SFU 204, or via the switch fabric network. This communication protocol is implemented by the PCE 216, which operates according to the MIPS 218. Each SFN 202 may also access other SFNs 202 via the switch fabric network when directed by the PCE 216.

In one embodiment, the atomic access primitives are supported by the DMU 302 and are persistent across the different levels of the hierarchy, allowing LPUs 210 within different lanes 206, as well as different SFNs 202, to coordinate operations. The flexible communication protocol is optimized for the hierarchical nature of the PPS 112, and allows each level of the hierarchy to maintain coherency within that hierarchical level.

In one embodiment, the homogeneous elements comprising each level of the hierarchical structure (the SFNs 202, the lanes 206, and the LPUs 210) are connected to the other homogeneous elements at the same level of the hierarchical structure with a crossbar. For example, the SFU 204, the SIU 208 and the LPU interconnect 212 could each be crossbars that connect the SFNs 202, the lanes 206, and the LPUs 210, respectively. In another embodiment, these homogeneous elements are each connected with a ring structure. In still further embodiments, various combinations of crossbars and ring structures provide connections between the homogeneous elements at each level of the hierarchical structure. For example, the SFNs 202 could be connected with a SFU 204 implemented as a ring structure, the lanes 206 could be connected with the SIU 208 implemented as a crossbar, and the LPUs 210 could be connected with interconnect 212 implemented as a ring structure.

Figure 3:
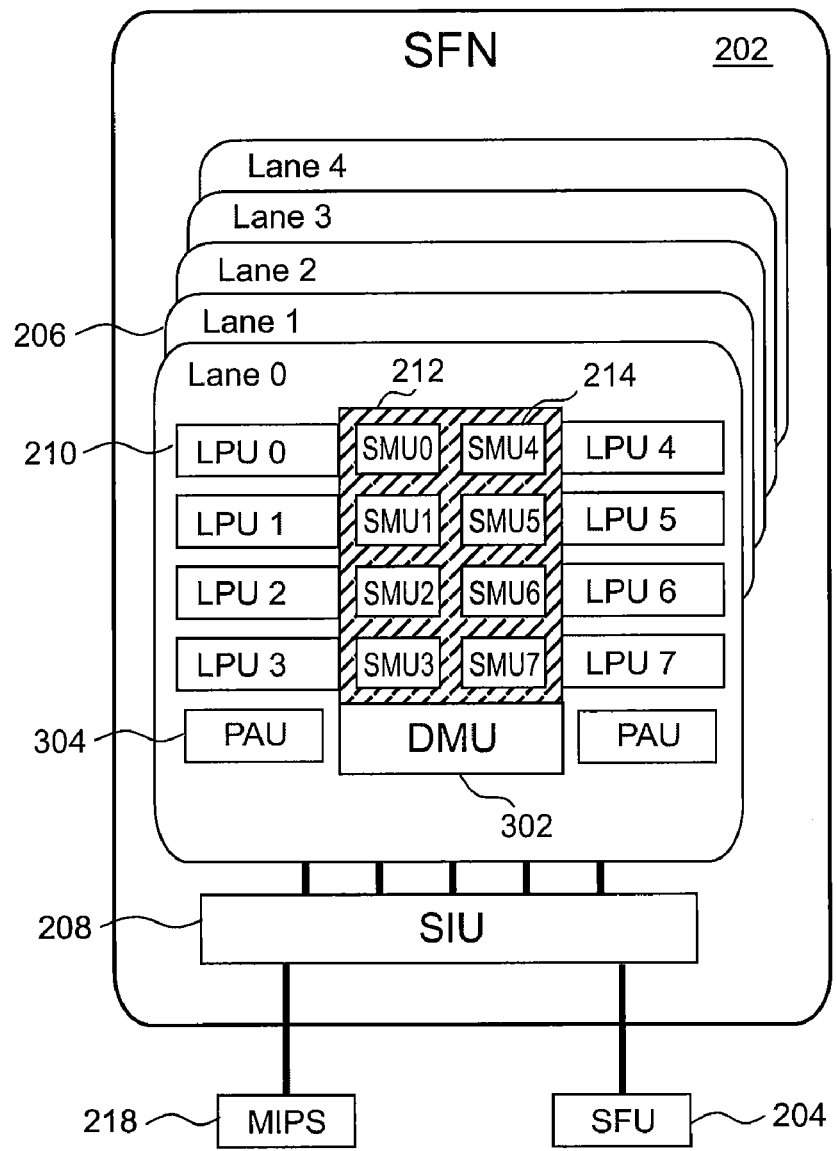
FIG. 3 is a block diagram of a switch fabric node, according to one embodiment of the invention.

FIG. 3 is a block diagram of an SFN 202, according to one embodiment of the invention. As show, FIG. 3 includes lanes 206, the SIU 208, LPUs 210, the LPU interconnect 212, SMUs 214, the MIPS 218, a data movement unit (DMU) 302, and one or more polynomial approximation units (PAUs) 304 that perform reciprocal and reciprocal square root approximations, as well as other polynomial approximations and other fixed functions.

When performing data-parallel operations, a set of instructions is fetched to be executed by the LPUs 210 in one of the lanes 206 from one of the EMUs 220 using the DMU 302 associated with that lane 206. The set of instructions is stored in the SMUs 214. Each LPU 210 may then access the common set of instructions via the LPU interconnect 212 and use those instructions to execute data-parallel operations. Each LPU 210 may also copy the instructions to a private cache and then execute the cached instructions.

In one embodiment, when performing task-parallel operations, the DMU 302 may retrieve multiple sets of instructions and store the sets of instructions temporarily in the SMUs 214. Each LPU 210 may then retrieve the relevant instruction set and copy the instruction set to a private cache (not shown) that is managed by local LPU resources. Each LPU 210 may then operate independently with the private instruction set to support task-parallel operations.

Additionally, atomic access primitives allow the PLUs 210 to maintain the coherency of the SMUs 214 while executing the set of instructions stored in the SMUs 214. Also, the PPS 112 allows messages to be sent across the SIU 208 so that LPUs 210 in different lanes that require loose coordination may communicate with one another.

When the PCE 216 configures a lane to perform either data-parallel or task-parallel operations, the LPUs 210 within the lane may be configured differently depending on current processing requirements. For example, a first group of LPUs 210 could be configured as master processors, while a second group of LPUs 210 could be configured as slave processors. In this configuration, the master processors would control the operation of the slave processors. In another configuration, one or more of the LPUs 210 could be turned off, and the SMUs 214 allocated to the deactivated SMUs 214 could be redistributed to the remaining LPUs 210, thus increasing the available memory space for the remaining LPUs 210. The portion of the SMUs 214 allocated to one LPU 210 may thus be adjusted by deactivating other LPUs 210 within the same lane 206.

The PCE 216 may also partition the SMUs 214 dynamically depending on current processing requirements. For example, if one of the lanes 206 was comprised of N LPUs 210, then the SMUs 214 could be partitioned into N partitions, and one SMU partition could be allocated to each LPU 210. Alternatively, the SMUs 214 could be partitioned into N/2 partitions, where each partition could be allocated to one pair of LPUs 210. The SMUs 214 within a lane may also be partitioned so that a first group of partitions store instructions to be executed by the LPUs 210, while a second group of partitions stores data to be processed by different LPUs 210. LPUs 210 may operate with data and instructions stored in public regions of the SMUs 214 that are accessible by the other LPUs 210 within the lane, or with data and instructions stored in private regions of the SMUs 214 allocated exclusively to each LPU 210.

Figure 4:
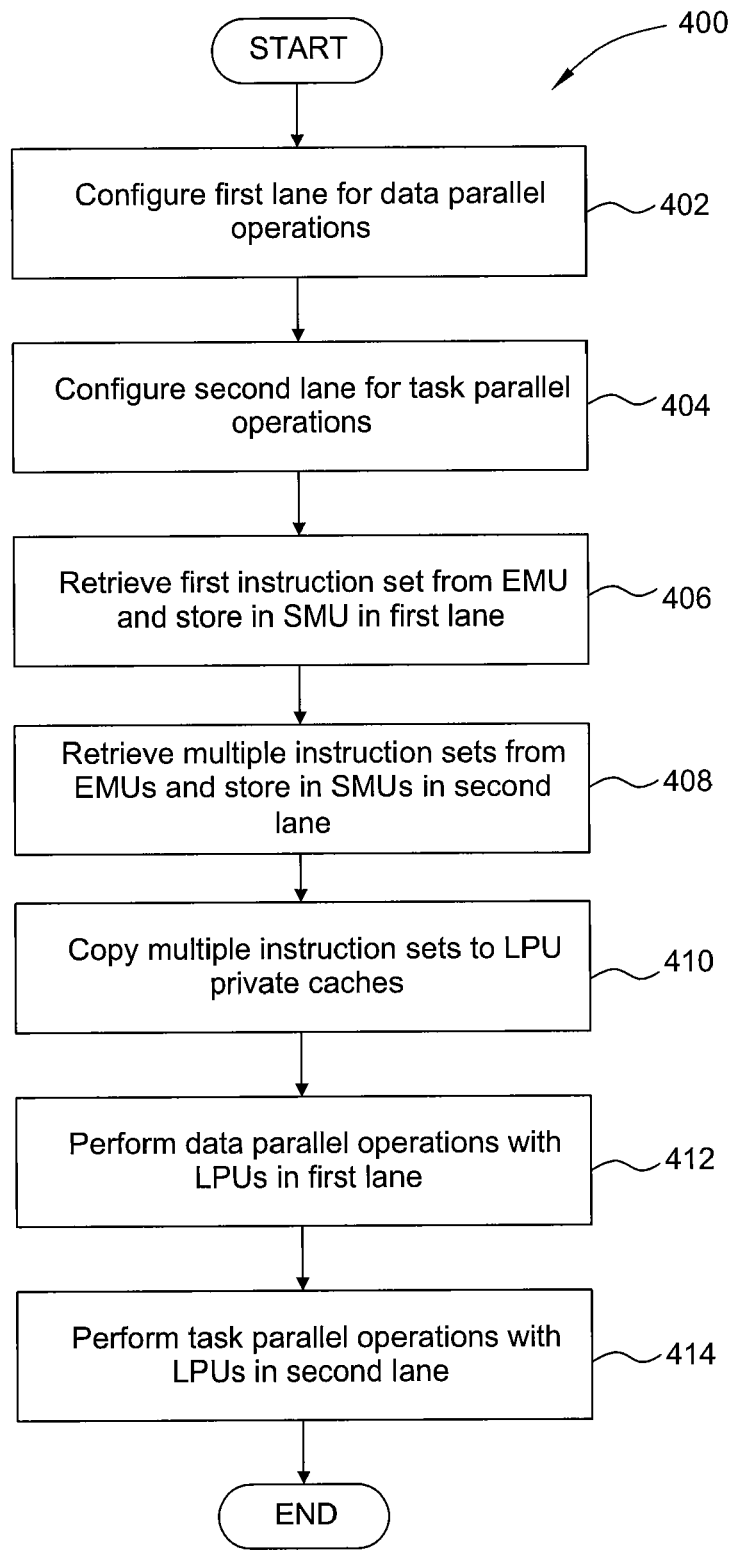
FIG. 4 is a flowchart of method steps for performing data-parallel operations and task-parallel operations simultaneously, according to one embodiment of the invention.

FIG. 4 is a flowchart of method steps for performing data-parallel operations and task-parallel operations simultaneously, according to one embodiment of the invention. Persons skilled in the art will understand that, even though the method 400 is described in conjunction with the system of FIGS. 1-3, any system configured to perform the method steps, in any order, is within the scope of the present invention.

As shown, the method 400 begins at step 402, where the PCE 216 configures a first lane for data parallel operations.

When configuring the first lane, the PCE 216 may access configuration registers within the SMUs associated with the first lane and write values to these registers that can be used to configure the LPUs associated with the first lane. PCE 216 may also partition the SMUs associated with the first lane to facilitate data-parallel operations. For example, the PCE 216 may partition the SMUs within the first lane into multiple partitions and assign one partition to each of the LPUs in the first lane.

At step 404, the PCE 216 configures a second lane for task-parallel operations. When configuring the second lane, the PCE 216 may similarly access configuration registers within the SMUs associated with the second lane and write values to these registers that can be used to configure the LPUs associated with the second lane. PCE 216 may also partition the SMUs 214 associated with the second lane to facilitate task-parallel operations. For example, the PCE 216 may partition the SMUs within the second lane into a number of partitions equal to a number of tasks to be performed by the second lane.

At step 406, the PCE 216 causes a DMU associated with the first lane to access one of the EMUs to retrieve a first instruction set to be executed by the LPUs within the first lane, and to store the first instruction set in the SMUs within the first lane.

At step 408, the PCE 216 causes a DMU associated with the second lane to access one or more of the EMUs to retrieve multiple instruction sets to be executed by the LPUs within the second lane. The multiple instruction sets are stored in the SMUs within the second lane. At step 410, the PCE 216 causes each LPU in the first and second lanes to copy one of the instruction sets from the SMUs into a private cache associated with the LPU.

At step 412, the PCE 216 causes the LPUs within the first lane to perform data parallel operations by executing the instruction set stored in the SMUs associated with the first lane. At step 414, the PCE 216 causes the LPUs within the second lane to perform task parallel operations by executing the multiple instruction sets stored in the private caches associated with each LPU in the second lane.

The method 400 describes the simultaneous operation of a first lane and a second lane, where the first lane performs data-parallel operations and the second lane performs task-parallel operations. However, the method 400 is applicable to more than two lanes operating simultaneously, and may be extended to include numerous other embodiments. In one embodiment, the PCE 216 configures multiple lanes to perform task-parallel operations with loose coordination. In another embodiment, the PCE 216 configures multiples lanes to perform data-parallel operations with a common instruction set. In yet another embodiment, a first plurality of lanes are configured to perform task-parallel operations, while a second plurality of lanes are configured to perform data-parallel operations, and the first and second pluralities of lanes are configured to loosely coordinate processing operations.

Alternative embodiments of the invention provide an SFU prioritization scheme, described in greater detail below in FIGS. 5-7. As discussed above, the PCE 216 may configure the one or more SFNs 202 and the one or more lanes 206 in various configurations based on application requirements. Similarly, the PCE 216 may configure the SIU, the SFU, or the switch fabric network to allow for prioritized access to the one or more EMUs.

Using conventional systems, memory accesses may be sequential or interleaved. Several problems exist with each of these prior art techniques. Regarding sequential access, some SFNs may become "starved," where transaction requests from those SFNs are placed in a queue when all of the EMU bandwidth is currently being utilized by other transaction requests. Starving an SFN may cause a significant bottleneck when the lanes 206 or the LPUs 210 of the starved SFN have no further operations to execute besides those that are queued.

Conventional interleaving also has inherent drawbacks. When using an interleaved technique, each SFN is allocated a portion of the total EMU bandwidth, so that no SFN is completely starved for bandwidth. However, data retrieval for every SFN may be delayed because there is an insufficient bandwidth allocation per SFN. This delay is especially detrimental to overall system efficiency when an SFN is waiting on a large data transfer in order to start working.

Embodiments of the invention provide a hybrid approach that utilizes a combination of prioritization, sequential access, and interleaved access. In general, there may several categories of memory access models, including block transactions that request a relatively large about of data from the one or more EMUs, and other types of transactions (e.g., streaming transactions and other transactions involving small amounts of data). A "block transaction," also referred to herein as a "bulk transaction," may be any transaction that requires a relatively large amount of data to be transferred from one or more of the EMUs.

As described above, using convention systems, all EMU transactions, including block transactions, are served using an interleaved transaction model. In one embodiment all memory access traffic is interleaved, by default, such that the required SFN bandwidth is distributed across the different EMUs in an interleaved manner to ensure fair bandwidth utilization and avoid EMU bottlenecks. For example, in the case of a block transaction, the first 512 bytes may be stored/read from EMU0, the next 512 bytes may be stored/read from EMU1, as so on. However, an SFN waiting on a block transaction to complete may be idle until the memory access is completed, causing a bottleneck. Thus, embodiments of the invention provide an SFN arbitration priority scheme can be utilized to ensure smaller latency for the ongoing bulk data transactions, allowing for an arbiter to distribute the bandwidth across all SIUs/SFNs.

According to embodiments of the invention, when a high-priority transaction is requested, the default interleaved scheme can be altered. An arbiter (e.g., the SIU, SFU, or other arbiter) may select a high-priority port for the high-priority transaction and allow for a block memory transaction to be performed. The arbiter can be configured to prioritize N number of such high-priority transactions, where N depends on the amount of remaining bandwidth distributed across the other SIUs. This hybrid scheme allows the programmer to use a combination of streaming access, random small access, as well as block transactions, depending on the requirement of the underlying application program. Streaming access and random small data accesses may be more efficient when performed using an interleaved architecture; whereas, block data transactions performed in an interleaved manner can result in an increased latency that can cause a performance bottleneck, especially if several SIUs request bulk transactions at the same time. Therefore, a priority scheme, as described herein, improves performance and allows a mix of all three data transactions with good overall latency.

Figure 5:
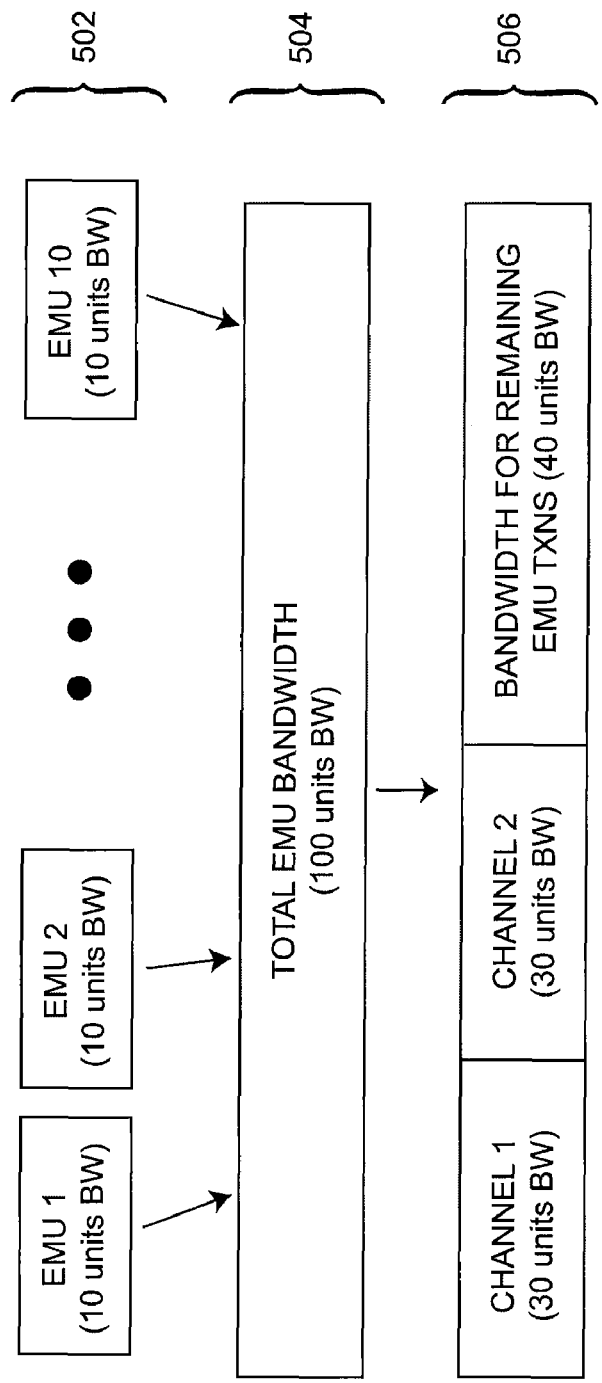
FIG. 5 is a conceptual diagram that illustrates a hybrid prioritization scheme, according to one embodiment of the invention.

FIG. 5 is a conceptual diagram that illustrates a hybrid prioritization scheme, according to one embodiment of the invention. Persons skilled in the art will understand that the conceptual diagram in FIG. 5 is simply one example of implementing the hybrid prioritization scheme, and that many other configurations are also within the scope of embodiments of the invention.

As shown, the parallel processing subsystem 112 may include ten EMUs 502. Each EMU may have a bandwidth of 10 units. Multiplying ten EMUs 502 by 10 units per EMU results in 100 units of total bandwidth 504. By default, all transaction requests may be arbitrated in an interleaved manner. However, as described above, the system may be configured to allow block transactions to be designated as high priority transactions and may allow these transactions to be prioritized. A "block transaction," also referred to herein as a "bulk transaction," may be any transaction that requires a relatively large amount of data to be transferred from one or more of the EMUs. As shown, each EMU in the parallel processing subsystem 112 may have a fixed bandwidth for data accesses between the EMU and the SFNs. In one embodiment, the total EMU bandwidth may be calculated by multiplying the bandwidth of each EMU by the total number EMUs. In alternative embodiments, the total EMU bandwidth may be determined by querying a register that indicates the total bandwidth of the EMUs.

In the example shown in FIG. 5, the system is configured to allow two different block transactions to be performed simultaneously in a high-priority manner via two channels, as shown in block 506. In one embodiment, the number of channels is configurable by an application programmer. The amount of bandwidth of a channel may be based on the bandwidth of the SIU interface, the SFN interface, or the switch fabric interface. For example, the SFN interface may be limited to 30 units of bandwidth, as shown, thus each channel allows for a maximum bandwidth of 30 units.

Continuing with the example shown in FIG. 5, a system may be operating such that all of the total EMU bandwidth is being utilized in an interleaved manner. Then, three different SFNs may each request a high priority transaction. As described, the system is configured with two channels for high priority transactions. The arbiter allows a first SFN to use the first channel for a first high-priority transaction, and allows a second SFN to use the second channel for a second high-priority transaction. The high-priority transaction requested from a third SFN (third high-priority transaction), however, is processed via the bandwidth allocated for the remaining EMU transactions in an interleaved manner. Once either the first or second high-priority transaction is complete, then the remaining portions of the third transaction that have not yet completed may be serviced by the now-available channel. Other high-priority transactions are serviced in this "round-robin" manner.

Figure 6:
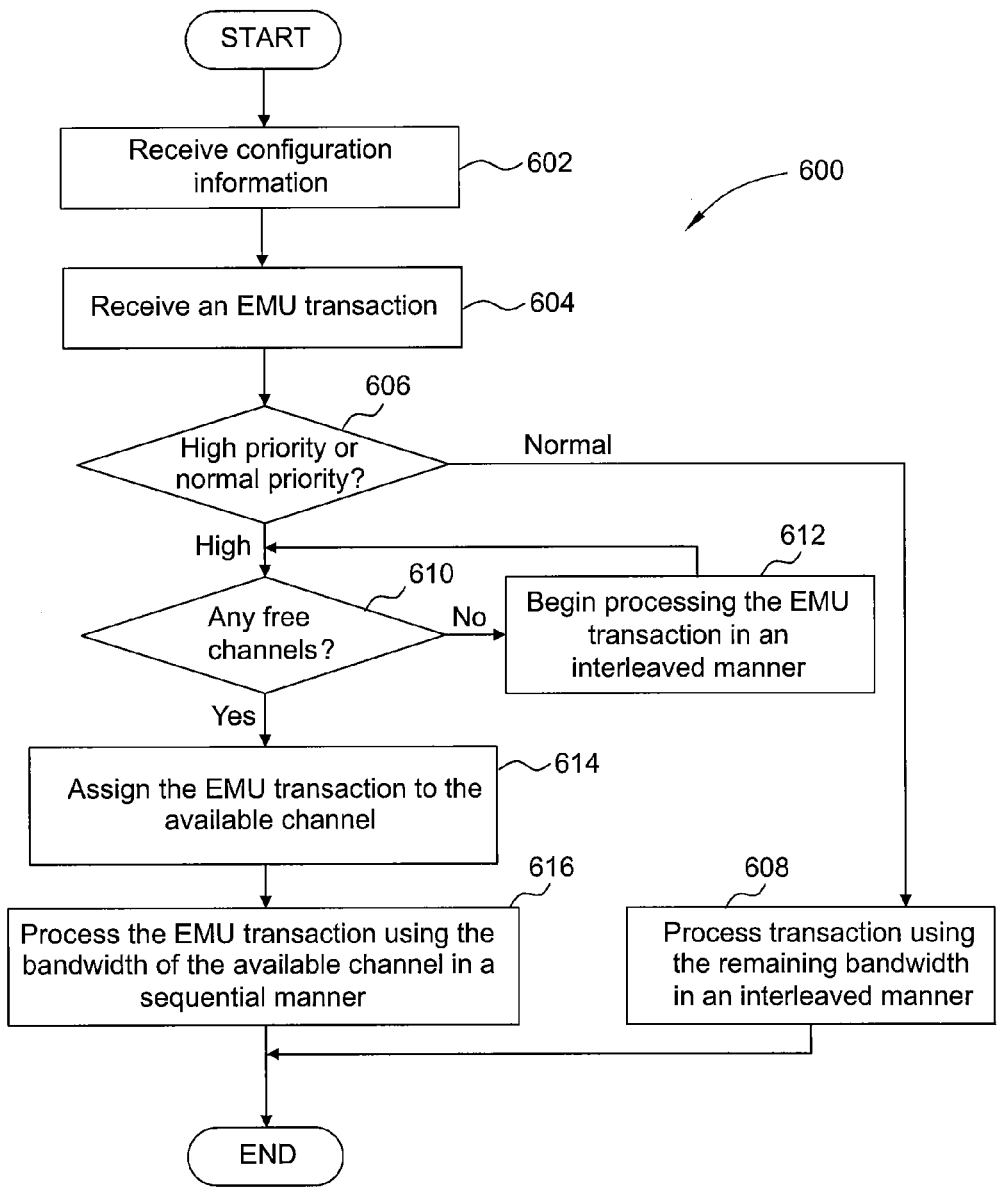
FIG. 6 is a flowchart of method steps for bandwidth management in a parallel processing architecture, according to one embodiment of the invention.

FIG. 6 is a flowchart of method steps for bandwidth management in a parallel processing architecture, according to one embodiment of the invention. Persons skilled in the art will understand that, even though the method 600 is described in conjunction with the system of FIGS. 1-3 and 5, any system configured to perform the method steps, in any order, is within the scope of the present invention.

As shown, the method 600 begins at step 602 where a PCE 216 receives configuration information that specifies a maximum number of channels to reserve for high priority EMU transactions. In one embodiment, the configuration information is provided by the application program that is executing on the parallel processing subsystem 112. In one embodiment, the developer may assign a priority bit to EMU transactions designates as high priority. These high priority accesses may be made via high priority "channels." A channel is a portion of the total EMU bandwidth that is allocated for sequential processing of high priority transactions. If no high priority transactions are currently being requested, then all transactions are processed in an interleaved manner.

At step 604, the SIU 218 receives an EMU transaction. At step 606, the SUI 218 determines whether the EMU transaction is a high priority transaction or a normal priority transaction. As described above, the application developer may indicate (e.g., tag or assign) a particular transaction as being a high priority transaction using a priority bit.

If, at step 606, the EMU transaction is determined to be a normal priority transaction, then the method 600 proceeds to step 608. At step 608, the EMU transaction is processed using the remaining bandwidth using an interleaved scheme. As described above, when no high-priority transactions are being processed, all of the remaining bandwidth comprises the total EMU bandwidth.

If, at step 606, the EMU transaction is determined to be a high priority transaction, then the method 600 proceeds to step 610. At step 610, the SIU 218 determines if there are any available channels for high priority transactions. As described above in FIG. 5, the system may be configured to allow for no more than a maximum number of high-priority transactions to be processed via the channels based on the configuration information received at step 602.

If no channels are available, then the method 600 proceeds to step 612 where the high-priority transaction is processed in an interleaved manner using the remaining bandwidth. The method 600 loops between steps 612 and 610 until a channel becomes available for the high priority EMU transaction. During this looping, the high priority transaction continues be processed in an interleaved manner. Once a channel is available, the method 600 proceeds to step 614. At step 614, the SUI 218 assigns the high priority transaction to the available channel.

At step 616, the high priority transaction is processed using the bandwidth allocated to the available channel in a sequential manner. In one embodiment, processing a high-priority transaction includes ensuring that an SFN port associated with the requesting SFN is served each time a packet request associated with the high-priority transaction is received by the arbiter.

In sum, the parallel processing subsystem (PPS) is configured with a hierarchically-organized architecture that includes individual lane processing units (LPUs) clustered together to create a lane. Each lane includes dedicated resources that allow the LPUs to perform either task parallel operations or data parallel operations, to perform exception handling, and to communicate with LPUs in other lanes. The lanes are clustered into switch fabric nodes (SFNs), and the SFNs are linked together via a switch fabric interface unit (SIU).

Advantageously, data parallel operations and task parallel operations are able to be performed on the same processor simultaneously. Operations that require tight synchronization may be performed within one lane, while operations that are amenable to loose synchronization may be distributed across multiple lanes or multiple SFNs. Additionally, the hierarchical structure implemented by the PPS is highly scalable because additional components, such as EMUs or LPUs, may be added to the PPS to scale processor throughput according to processing requirements. Furthermore, each LPU is constructed to provide the minimal functionality required to meet the design goals of the PPS, and so the LPUs consume less power than traditional processing cores, and more LPUs may be packed into a smaller area. Thus, the performance per unit area of the PPS is maximized. Additionally, each level of the hierarchy can be reconfigured by software to execute task parallel or data parallel operations. The reconfigurable nature of the LPUs also supports a more cost-effective manufacturing process because a PPS with faulty components can be re-programmed as a lower-throughput processor, thus increasing the total yield (i.e., "floor sweeping" support).

Additionally, embodiments of the invention provide a priority scheme where "normal" traffic is interleaved to provide low latency, and large or bulk traffic can be given a high priority. In this manner, the large, high priority traffic can be processed as quickly as possible, in a more sequential fashion, to ensure that the LPUs can start processing the data as soon as possible. Importantly, the number of channels allocated for high priority transactions can be configured to meet the needs of the particular application. For example, if too many SFNs or lanes attempt to request high priority data transfers, then the SIU selects the first n number of SFNs to use the n channels, and processes the other high priority requests in an interleaved manner until a channel becomes available. Using this hybrid prioritization scheme allows for fast processing for those n SFNs, but still provides enough bandwidth to ensure that other non-high-priority SFNs do not starve.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A system for performing data-parallel operations and task-parallel operations, comprising:
 a first switch fabric node (SFN), including:
  a first lane processing engine (LPE) having a first set of lane processing units (LPUs) configured to perform data-parallel operations, wherein in-order scheduling is implemented across the first set of LPUs, each LPU within the first set of LPUs performs a set of operations, each LPU within the first set of LPUs uses a different set of data for the set of operations, and the first set of LPUs accesses a first set of shared memory units (SMUs) via a first LPU interconnect; and
  a second LPE having a second set of LPUs configured to perform task-parallel operations, wherein in-order scheduling is implemented across the second set of LPUs, each LPU within the second set of LPUs performs a different set of operations, and the second set of LPUs accesses a second set of SMUs via a second LPU interconnect; and
 a processing control engine (PCE) configured to distribute instructions and data to the first LPE and the second LPE, wherein the instructions and data are associated with the data-parallel operations and the task-parallel operations as the case may be, wherein the PCE is further configured to:
cause a first data movement unit (DMU) associated with the first LPE to transmit a first instruction set and multiple data sets to the first set of SMUs; and
cause a second DMU associated with the second LPE to transmit multiple instruction sets to the second set of SMUs.

2. The system of claim 1, wherein each LPU included in the first set of LPUs is configured to:
extract the first instruction set from the first set of SMUs;
copy the extracted instruction set to a private cache within the LPU; and
execute the extracted instruction set using one of the multiple data sets.

3. The system of claim 2, wherein each LPU included in the second set of LPUs is configured to:
extract one of the multiple instruction sets from the second set of SMUs;
copy the extracted instruction set to a private cache within the LPU; and
execute the extracted instruction set.

4. The system of claim 3, further comprising a switch fabric unit (SFU) configured to couple the first SFN to one or more external memory units (EMUs) and to one or more other SFNs.

5. The system of claim 4, wherein each LPU included in the first set of LPUs supports atomic access primitives that allow the LPU read and write access to the first set of SMUs.

6. The system of claim 4, further comprising an arbiter configured to prioritize access to the one or more external memory units (EMUs) from the first SFN or the one or more other SFNs.

7. The system of claim 5, wherein each LPU included in the second set of LPUs supports atomic access primitives that allow the LPU read and write access to the second set of SMUs.

8. The system of claim 7, wherein the first LPE and the second LPE are coupled by a switch fabric interface unit (SIU).

9. The system of claim 8, further comprising a second SFN coupled to the first SFN by the SFU.

10. The system of claim 9, wherein the first set of SMUs includes a plurality of memory-mapped registers accessible by the PCE that allow the PCE to configure the first LPE.

11. The system of claim 10, wherein the second set of SMUs includes a plurality of memory-mapped registers accessible by the PCE that allow the PCE to configure the second LPE.

12. The system of claim 11, wherein the SFU is implemented as a crossbar or as a ring structure.

13. The system of claim 11, wherein the first LPU interconnect is implemented as a crossbar or as a ring structure.

14. The system of claim 11, wherein the SIU is implemented as a crossbar or as a ring structure.

15. A computing device for performing data-parallel operations and task-parallel operations, comprising:
a processing subsystem having a first switch fabric node (SFN) that includes:
a first lane processing engine (LPE) having a first set of lane processing units (LPUs) configured to perform data-parallel operations, wherein in-order scheduling is implemented across the first set of LPUs, each LPU within the first set of LPUs performs a set of operations, each LPU within the first set of LPUs uses a different set of data for the set of operations, and the first set of LPUs accesses a first set of shared memory units (SMUs) via a first LPU interconnect; and
a second LPE having a second set of LPUs configured to perform task-parallel operations, wherein in-order scheduling is implemented across the second set of LPUs, each LPU within the second set of LPUs performs a different set of operations, and the second set of LPUs accesses a second set of SMUs via a second LPU interconnect; and
a system memory storing a processing control engine (PCE) configured to distribute instructions and data to the first LPE and the second LPE, wherein the instructions and data are associated with the data-parallel operations and the task-parallel operations as the case may be, wherein the PCE is further configured to:
cause a first data movement unit (DMU) associated with the first LPE to transmit a first instruction set and multiple data sets to the first set of SMUs; and
cause a second DMU associated with the second LPE to transmit multiple instruction sets to the second set of SMUs.

16. The computing device of claim 15, one or more LPUs included in the first set of LPUs is configured as a master processor, and one or more other LPUs included in the first set of LPUs is configured as a slave processor, wherein the one or more master processors control the operation of the one or more slave processors.

17. The computing device of claim 15, wherein one or more LPUs included in the first set of LPUs is turned off, and a set of shared memory units (SMUs) associated with the first lane is configured to be accessed by only the other LPUs included in the first set of LPUs.

18. A computer-readable medium storing instructions, that when executed by a processor, cause a processor to perform data-parallel operations and task-parallel operations, by performing the steps of:
configuring a first lane processing engine (LPE) having a first set of lane processing units (LPUs) to execute data-parallel operations, wherein in-order scheduling is implemented across the first set of LPUs, each LPU within the first set of LPUs performs a set of operations, and each LPU within the first set of LPUs uses a different set of data for the set of operations;
configuring a second LPE having a second set of LPUs to execute task-parallel operations, wherein in-order scheduling is implemented across the second set of LPUs, and each LPU within the second set of LPUs performs a different set of operations;
causing a first data movement engine (DMU) associated with the first LPE to retrieve a first instruction set associated with the data-parallel operations from an external memory unit (EMU) and to store the first instruction set in a first set of shared memory units (SMUs) associated with the first LPE;
causing a second DMU associated with the second LPE to retrieve multiple instruction sets from one or more EMUs and to store the multiple instruction sets associated with the task-parallel operations in a second set of SMUs associated with the second LPE;
causing each LPU in the first set of LPUs to copy the first instruction set from one of the SMUs included in the first set of SMUs into a private cache associated with the LPU; and
causing each LPU in the second set of LPUs to copy one of the multiple instruction sets from one of the SMUs included in the second set of SMUs into a private cache associated with the LPU.

* * * * *